(12) United States Patent
Smith (10) Patent No.: US 11,044,280 B1
(45) Date of Patent: Jun. 22, 2021

(54) LOCATION-BASED CONTROLS FOR REMOTE VISITATION IN CONTROLLED-ENVIRONMENT FACILITIES

(71) Applicant: Securus Technologies, Inc., Carrollton, TX (US)

(72) Inventor: Matthew Richard Smith, McKinney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/782,313

(22) Filed: Feb. 5, 2020

Related U.S. Application Data (63) Continuation of application No. 15/719,840, filed on Sep. 29, 2017, now Pat. No. 10,560,497.

(51) Int. Cl.
*H04L 29/06* (2006.01)
*H04L 29/08* (2006.01)

(52) U.S. Cl.
CPC ........ *H04L 65/1073* (2013.01); *H04L 63/306* (2013.01); *H04L 67/18* (2013.01)

(58) Field of Classification Search
CPC .... H04L 65/1073; H04L 63/306; H04L 67/18
See application file for complete search history.

(56) References Cited

U.S. PATENT DOCUMENTS

| | | | |
|---|---|---|---|
| 7,447,194 B1 | 11/2008 | Schlesener et al. | |
| 9,426,303 B1 | 8/2016 | Dwards et al. | |
| 9,729,709 B1 | 8/2017 | Edwards et al. | |
| 9,883,339 B1* | 1/2018 | Gu | H04L 67/306 |
| 2009/0262906 A1* | 10/2009 | Goldman | H04M 3/42391 379/52 |
| 2009/0304167 A1* | 12/2009 | Wright | H04M 3/436 379/142.05 |
| 2011/0206038 A1* | 8/2011 | Hodge | H04M 3/385 370/352 |
| 2011/0293082 A1 | 12/2011 | Gauri | |
| 2012/0013475 A1 | 1/2012 | Farley et al. | |
| 2012/0195234 A1 | 8/2012 | Cai et al. | |
| 2013/0194377 A1* | 8/2013 | Humphries | H04L 65/1076 348/14.08 |
| 2013/0253831 A1 | 9/2013 | Langendorff | |
| 2013/0260795 A1 | 10/2013 | Papakipos et al. | |
| 2013/0303192 A1 | 11/2013 | Louboutin et al. | |
| 2014/0092047 A1 | 4/2014 | Nara et al. | |
| 2016/0212392 A1* | 7/2016 | Zhang | H04N 9/3194 |
| 2016/0232785 A1* | 8/2016 | Wang | G08G 1/096816 |
| 2017/0075308 A1* | 3/2017 | Ivesha | G01S 19/16 |

* cited by examiner

*Primary Examiner* — Joshua D Taylor
(74) *Attorney, Agent, or Firm* — Fogarty LLP (57) ABSTRACT

Systems and methods for developing, deploying, and/or providing location-based controls for remote visitation in controlled-environment facilities are disclosed. In some embodiments, a method may include identifying a request to establish a visitation session between a resident and a non-resident of a controlled-environment facility, wherein the visitation session includes at least one of: a voice or a video call, and wherein the non-resident operates a mobile device; receiving spatial information of the mobile device; and applying a rule to the visitation session based upon the spatial information.

16 Claims, 9 Drawing Sheets

LOCATION-BASED CONTROLS FOR REMOTE VISITATION IN CONTROLLED-ENVIRONMENT FACILITIES

CROSS-REFERENCE TO RELATED APPLICATIONS

This application is a continuation of, and claims benefit of, U.S. patent application Ser. No. 15/719,840, titled LOCATION-BASED CONTROLS FOR REMOTE VISITATION IN CONTROLLED-ENVIRONMENT FACILITIES and filed on Sep. 29, 2017, hereby incorporated by reference herein in its entirety.

TECHNICAL FIELD

This specification relates generally to controlled-environment facilities, and, more particularly, to systems and methods for developing, deploying, and/or providing location-based controls for remote visitation in controlled-environment facilities.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install or otherwise deploy communication and/or media access devices in different parts of the facility. Such communication and/or media access devices are generally used to enable inmate communications but may also be used for other purposes.

SUMMARY

Embodiments disclosed herein are directed to systems and methods for developing, deploying, and/or providing location-based controls for remote visitation in controlled-environment facilities. In an illustrative, non-limiting embodiment, a method may include identifying a request to establish a visitation session between a resident and a non-resident of a controlled-environment facility, where the visitation session includes at least one of: a voice or a video call, and wherein the non-resident operates a mobile device; receiving spatial information of the mobile device; and applying a rule to the visitation session based upon the spatial information.

In some implementations, the controlled-environment facility may be a correctional facility, and the resident may be an inmate. The spatial information may include a location of the mobile device and applying the rule may include determining that the location is within a selected geographic area.

Additionally, or alternatively, the spatial information may include a direction of travel of the mobile device, and applying the rule may include determining that the direction of travel is within a selected trajectory. For example, the trajectory may be selected along a highway used in a criminal activity associated with the resident. Additionally, or alternatively, the spatial information may include a proximity to another mobile device associated with another non-resident.

In some cases, the method may include receiving the spatial information periodically during the visitation. The method may also include charging an account of the resident for a telecommunication provider's fees associated with providing the information.

In some embodiments, applying the rule may include at least one of: flagging the visitation session for monitoring or recording, or issuing an alert provided in the rule. Moreover, the visitation session may be a Video Relay Service (VRS) call.

In various embodiments, one or more of the techniques described herein may be performed by one or more computer systems. In other various embodiments, a hardware memory device may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Various types of controlled-environment facilities are used in today's society, and persons may be voluntary or involuntary residents of those facilities, whether temporarily or permanently. Examples of controlled-environment facilities include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, schools, barracks, etc.), and the like.

Systems and methods described herein may be applicable to any type of controlled-environment facility and its residents. For convenience of explanation, however, various examples herein are discussed in the context of correctional facilities. In some examples, a controlled-environment facility may be referred to as a correctional facility, jail, or prison, and its residents may be referred to as inmates, arrestees, or detainees.

Among other types of controlled-environment facilities, correctional facilities stand out in that it can still present numerous, unique difficulties in areas such as security, surveillance, financial transactions, communications, visitation, investigation, budgets, etc.; which in turn make technological implementations uniquely challenging in those environments. Often, technologies that are used outside of correctional facilities are not immediately applicable to the correctional environment without significant changes and modifications. Moreover, correctional facilities may have specific needs that are not particularly relevant outside of those environments. As such, some of the systems and methods described herein may be specifically tailored to address one or more of the aforementioned needs and challenges.

This specification relates generally to systems and methods for developing, deploying, and/or providing location-based controls for video visitation in controlled-environment facilities.

Figure 1:
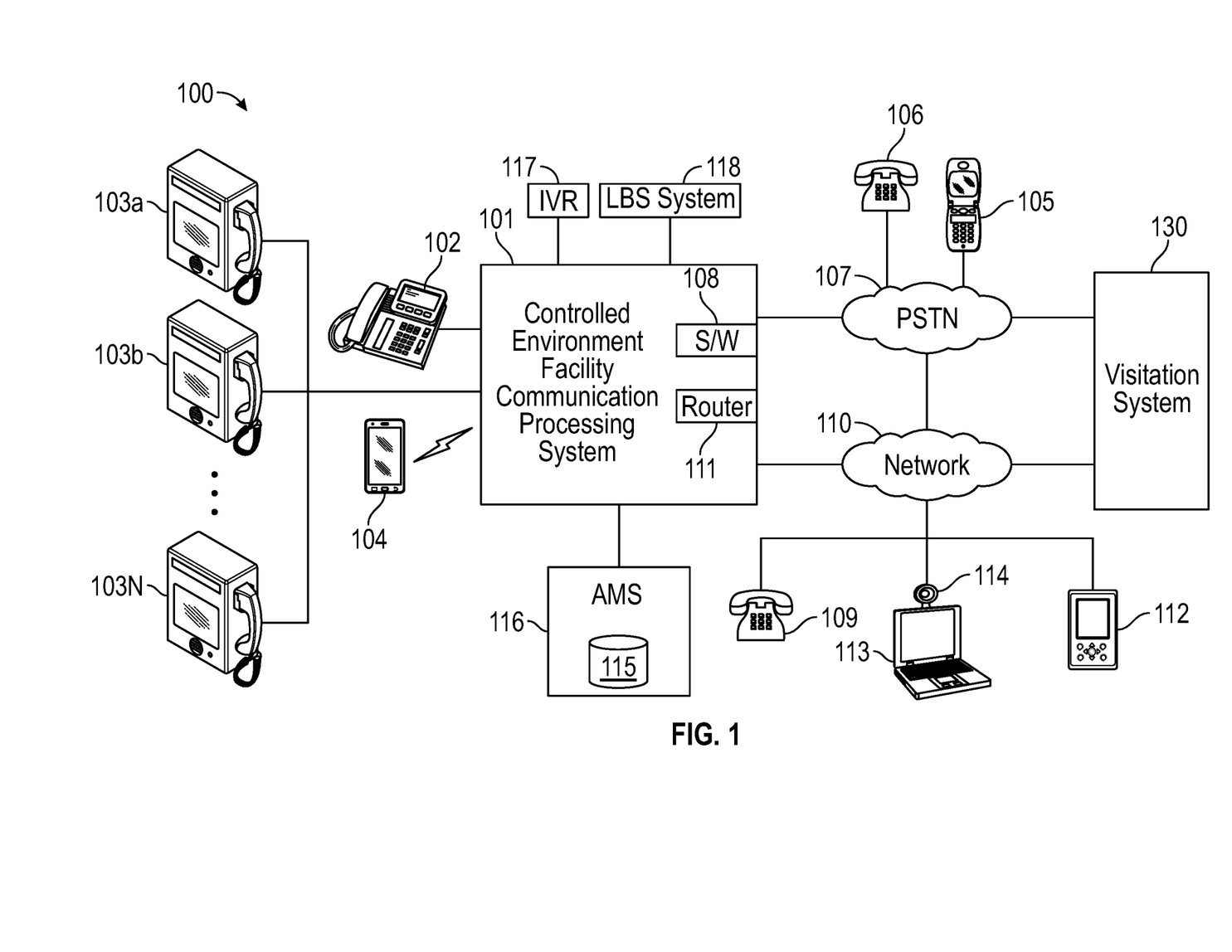
FIG. 1 is a diagram of an example of a system for developing, deploying, and/or providing location-based controls for remote visitation in controlled-environment facilities according to some embodiments.

Turning now to FIG. 1, a block diagram of an example of a system for developing, deploying, and/or providing location-based controls for remote visitation in controlled-environment facility 100 is depicted, according to some embodiments. As shown, communication processing system 101 may provide telephone services, videoconferencing, online chat, email, and other communication services to controlled-environment facility 100 (e.g., a correctional facility).

In some cases, communication system 101 may be co-located with controlled-environment facility 100. Alternatively, communication system 101 may be centrally or remotely located with respect to one or more controlled-environment facilities and/or may provide communication services to multiple controlled-environment facilities. More generally, however, it should be noted that communication system 101 may assume a variety of forms and may be configured to serve a variety of facilities and/or users, whether within or outside of controlled-environment facility 100.

In the context of a correctional facility, for instance, inmates may use telephones 102 to access certain communication services. In some cases, inmates may also use a personal computer wireless device 104 (e.g., a tablet or cell phone) to access such services. For example, an inmate may initiate telephone services by lifting the receiver on telephone 102, at which time the inmate may be prompted to provide a personal identification number (PIN), other identifying information or biometrics. An interactive voice response (IVR) unit 117 may generate and play prompt or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across Publicly Switched Telephone Network (PSTN) 107. For example, device 105 may be a mobile phone, whereas telephone 106 may be located at a non-resident's home, inmate visitation center, etc. Switch 108 in communication processing system 101 may be used to connect video visitation sessions or calls across PSTN 107. Additionally, or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a video visitation session or call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally, or alternatively, device 112 may have an integrated camera and display (e.g., a smart phone, tablet, etc.).

A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116.

In some embodiments, a PAC list may identify each person approved to communicate with a given inmate, as well as a relationship between that person and the inmate (e.g., friend, attorney, spouse, child, parent, cousin, uncle, aunt, etc.). In addition to PAC list(s), AMS 116 may also store inmate or Resident Profile Data or RDP (e.g., full name, date and place of birth, residence(s), etc.), as well as any visitation rules applicable to each inmate. Database 115 may also include other personal information about each inmate.

As an example, still in the context of a correctional facility, database 115 may include information such as balances for inmate trust and calling accounts; litigation and judicial hearing schedule; conviction data (e.g., indicating the gravity of a crime); past criminal record; sentencing data, time served, time remaining to be served, and release date; cell and cellmate assignments; inmate restrictions and warnings; commissary order history; video visitation history; video recordings; telephone call history; call recordings; known or suspected gang or criminal affiliations; known or suspected affiliates, accomplices, or gang members; and any other information that may be relevant or useful to correctional facility staff to house and maintain inmates.

For example, database 115 may include, for each inmate, one or more geographical zones of interest—e.g., places that likely contain evidence against the inmate or its accomplices. These zones may have boundaries arbitrarily drawn on a geographical map. Additionally, or alternatively, a zone of interest may be circular with a center (e.g., latitude and longitude, building, city, etc.) and a radius, or it may have other regular geometric shape (e.g., a square). Additionally, or alternatively, the geographical zone of interest may be a section of a road, street, or highway suspected to be used as a criminal activity corridor (e.g., drug smuggling, human trafficking, etc.). Additionally, or alternatively, the geographical zone of interest may be a public transportation area (e.g., airport, bus station, train station, docks, etc.).

Generally speaking, database 115 may include any suitable type of application or data structure that may be configured as a data repository. For example, database 115 may be configured as one or more relational databases that include one or more tables of columns and rows and that may be searched or queried according to a query language, such SQL or the like. Alternatively, database 115 may be configured as structured data stores that include records formatted according to a markup language, such as XML, or the like. In other embodiments, database 115 may be implemented using one or more arbitrarily or minimally structured files managed and accessible through a corresponding type of application.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some cases, communication system 101 may facilitate communications between communication devices via one or more carriers or intermediate service providers. An example of such a carrier or provider is a video relay service (VRS) provider. A VRS, also sometimes known as a video interpreting service (VIS), is a service that allows deaf, hard-of-hearing and speech-impaired (D-HOH-SI) individuals to communicate over video telephones and similar technologies with hearing people in real-time, via a sign language interpreter. In the United States, VRS services are regulated by the U.S. Federal Communications Commission (FCC).

In some embodiments, video visitation devices 103 may be implemented as computer-based systems. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally, or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Figure 2:
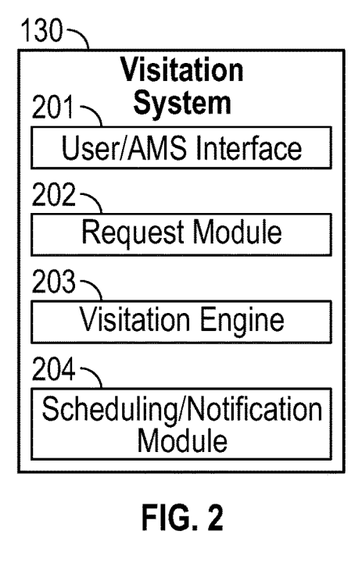
FIG. 2 is a diagram of an example of a visitation system according to some embodiments.

Referring to FIG. 2, a block diagram of visitation system 130 for providing visitation services to residents and non-residents of a controlled-environment facility is depicted according to some embodiments. As shown, visitation system 130 includes user and/or AMS interface 201. In some embodiments, residents and/or non-residents of one or more controlled-environment facilities may access, interact with, or otherwise use visitation system 130 via interface 201. For example, interface 201 may be provided as a web interface, IVR interface, or the like. Visitation system 130 may also interact with one or more AMS systems 116 either directly or via a computer network such as the Internet 110 using interface 201.

In some scenarios, a resident and/or non-resident may connect to visitation system 130 via interface 201. For example, the resident and/or non-resident may directly or indirectly (e.g., through an officer or personnel of the controlled-environment facility) reach a computer terminal or a telephone disposed within a controlled-environment facility and request visitation services. In other scenarios, the resident and/or non-resident may interact with interface 201 via PSTN 107 using an IVR system or the like. Additionally or alternatively, the resident and/or non-resident may access interface 201 via a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, interface 201 may be deployed using a number of suitable techniques. For example, interface 201 may be implemented using Hypertext Markup Language (HTML), Common Gateway Interface (CGI), JavaScript, PHP, Perl, C/C++, or any suitable combination of these or other commercial, open source and/or proprietary languages, frameworks or development environments for generating and distributing web-based information. Further, in some implementations, request and response data may be exchanged between a client and visitation system 130 through the use of messages or documents formatted in eXtensible Markup Language (XML) or other platform-independent data format.

For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In addition to interface 201, visitation system 130 includes visitation request module 202, visitation engine 203, and visitation scheduling/notification module 270. Visitation request module 202 may be configured to receive one or more visitation scheduling requests, modification requests, or cancellation requests, for example, via interface 201.

Visitation engine 203 may be configured to execute an incoming request, for example, by facilitating a voice, video, and/or electronic connection to take place between one or more residents and one or more non-residents. In some implementations, visitation engine 203 may be configured to identify that the resident and non-resident requesting to have an electronic communication are a parent and his child by consulting AMS 116 via interface 201.

In some cases, visitation engine 203 may be configured to record and store a parent-child communication and flag in a recording database. Additionally, or alternatively, visitation engine 203 may facilitate the participation of a counselor in the parent-child communication in real-time.

Visitation scheduling/notification module 204 may be configured to schedule a new visitation and/or notify a relevant party (e.g., resident, non-resident, counselor, etc.) of the new visitation. Scheduling/notification module 204 may also be configured to modify a previously scheduled visitation and/or notify a relevant party of the modification, or cancel a previously scheduled visitation and/or notify a relevant party of the canceled visitation.

In some embodiments, visitation engine 203 may be configured to store a plurality of rules usable by request module 202 and/or scheduling/notification module 204 during the course of their respective operations. For example, visitation engine 203 may store one or more scheduling rules that allows (or prohibits) certain persons to perform a visitation scheduling operation. Those rules may be applied to incoming visitation requests by visitation request module 202. Also, engine 203 may include other rules regarding notifications or conflict resolution operations that may be employed by scheduling/notification module 204.

In various implementations, the systems shown in FIG. 1 may be used to provide location-based controls of video visitation sessions or calls. For example, using spatial or location information of wireless, portable, or mobile devices, such as when an inmate calls a cell phone or other wireless device, the systems of FIG. 1 may store and trigger alert events based on the device's spatial, physical, or geographic location information (e.g., latitude/longitude, carrier, cell sector, tower triangulation, Global Positioning System (GPS) coordinates, IP address information, etc.).

Figure 4:
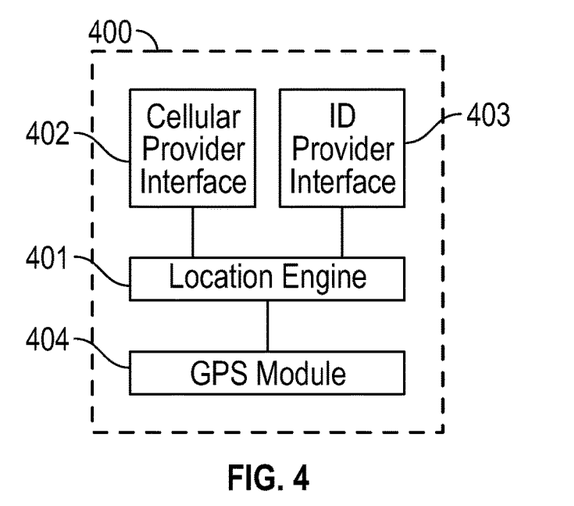
FIG. 4 is a diagram of an example of a location processor according to some embodiments.

Spatial information may be used, for example, for law enforcement or investigation purposes. For instance, Location-Based Services (LBS) system 120 and/or location engine 401 may be configured to make positive identification that a phone number is a wireless phone or other portable device, an identification of the carrier providing service to that mobile device, the billing name and address (BNA) registered to the device, the GPS coordinates of the device at the time of a video visitation session or call (longitude and latitude), the cell sector and tower information and triangulation (e.g., if GPS is not available, using closest three wireless towers to GEO fence signal), and IP address of the mobile device, as well as a margin or level of uncertainty of the device's determined physical location.

Using spatial or location information, controlled environment facility 100 (or a service provider serving that facility) may be able to make decisions regarding how to handle a video visitation session or call from an inmate, determine whether to connect the video visitation session or call based on distance between the non-resident and the facility, how to rate the video visitation session or call based on cell phone location (e.g., using actual location instead of BNA to arbitrage long distance calls to cell phone numbers), trigger alerts if a video visitation session or call is placed into (or outside of) a pre-determined geographical area, provide interactive investigative tools to show where video visitation sessions or calls are connecting based on physical location in addition to BNA (e.g., using mapping technology and if warranted or court-ordered), provide real-time spatial or location information to law enforcement (such as to find an escapee or a drug smuggling deal), etc.

In some embodiments, LBS system 118 may be configured to enable a called party to opt in/opt out by way of disclaimers at the beginning of communications they receive from inmates, identify called party wireless information, verify that a called party's phone number is a wireless number, identify the called party's wireless carrier, latitude and longitude, BNA, etc. LBS system 118 may also be configured to establish a geo-fence configured to allow video visitation sessions or calls, or to deny video visitation sessions or calls for security reasons, or to trigger alert(s) when the called party's location is within a pre-configured geographic region (i.e., in violation of one or more geo-fence rules).

Furthermore, LBS system 118 may be configured to facilitate the creation of Call Detail Records (CDRs), to generate CDR reports reflecting wireless information and easy-to-view interactive map of location and geo-fence information, to implement payment capabilities to charge for the added investigative capabilities logic of geo-fencing, and to map called party coordinates using actual physical or geographic location information.

In some cases, investigators may set up a phone number, an inmate account, a specific phone, a geographical location within or outside of facility 100, a location within facility 100, or a combination thereof to trigger an alert when used. For instance, when a selected inmate places a video or phone call and/or when a predetermined mobile device is called, LBS system 118 may trigger an alert to an investigator. The alert may be triggered, for example upon the investigator having established a physical or geographical location to and/or from which the inmate may not communicate.

Additionally, or alternatively, LBS system 118 may allow a law enforcement officer or investigator to upload a warrant or court order and receive location information real time based on a phone number, IP address, or the like. Additionally or alternatively, a communication may be rated based on true location termination, a decision to either allow or deny a video visitation session or call based on the proximity to the corrections facility, and a mobile device's location may be tracked at the beginning, end, and/or throughout the video visitation session or call to provide driving or moving patterns on a map or the like.

Figure 3:
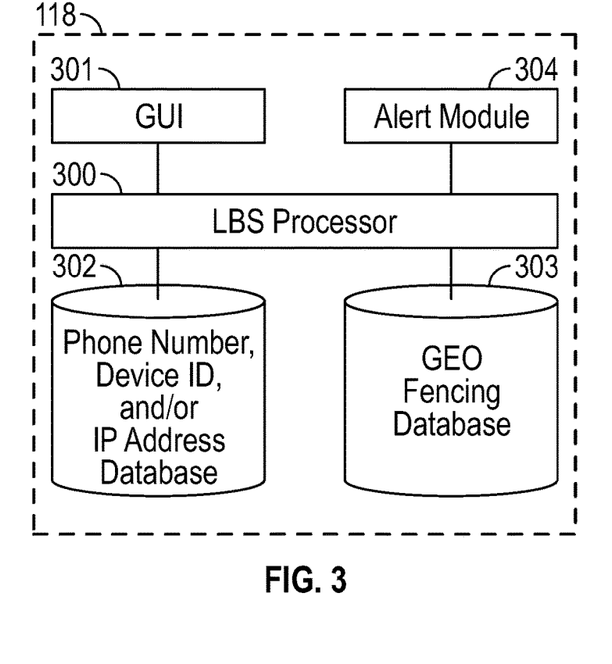
FIG. 3 is a diagram of an example of a Location-Based Services (LBS) system according to some embodiments.

FIG. 3 is a block diagram of LBS system 118 according to some embodiments. As shown, LBS system 118 includes LBS processor 300 operably coupled to Graphical User Interface (GUI) module 301, alert module 304, phone number, device ID (e.g., Media Access Control or "MAC" address, etc.), and/or IP address database 302, and geo-fencing database 303.

In operation, LBS processor 300 may receive a request (e.g., from a resident of a facility 100 through communication processing system 101) to establish a remote communication with a mobile device (e.g., 108a-n and/or 112a-n) operated by a non-resident of the facility and it may allow or deny the request depending, at least in part, upon whether the non-resident has previously provided an authorization to disclose a physical and/or geographical location of the mobile device. For instance, LBS processor 300 may receive the request and consult database 302 to determine whether the called device is a mobile device and/or whether the non-resident registered to that device is the person operating that device.

GUI module 301 may be used to allow one or more users to interact with LBS system 118 to access databases 302 and/or 303, manage registered devices and/or authorizations, create or modify geo-fencing rules, view alerts, etc. For example, geo-fencing database 303 may include one or more rules that, if violated (e.g., a called number is outside an allowed geographic area and/or within a forbidden area), cause alert module 304 to generate and/or transmit an alert to one or more selected persons (e.g., by phone, email, text message, etc.).

FIG. 4 is a diagram of software 400 executable by LBS processor 300, according to some embodiments. As illustrated, location engine 401 is operably coupled to cellular provider interface 402, IP provider interface 403, and GPS module 404. In operation, location engine 401 may receive an instruction, message, or command from LBS processor 300 requesting the physical location of a given communication device.

If the device is being served by a wireless carrier, then cellular provider interface 401 may be used to query the wireless carrier for physical information of the device (e.g., cell ID, sector ID, etc.). Conversely, if the device is being served by an ISP (e.g., over a wired or wireless connection), then IP provider interface 403 may be used to query the ISP for physical information of the device (e.g., IP address, etc.).

In some embodiments, elements of location engine 401 may be at least in part integrated into a communication device, in which case GPS module 404 may provide the device's coordinates (i.e., latitude and longitude). When receiving latitude and longitude directly from wireless providers or ISPs, location engine 401 may identify range of accuracy or margin of uncertainty, for example, based on carrier type and available information.

For instance, tier 1 carriers may provide an exact latitude and longitude accurate within a couple meters, whereas for non-tier 1 carriers the accuracy may be within miles (e.g., if the technology is based on three closest cell towers). Upon retrieving the physical location information through one or more of modules 401-404, location engine 401 may fulfill the original request and transmit the device's spatial or location information to communication processing system 101.

In some embodiments, modules or blocks shown in FIGS. 2-4 may represent processing circuitry and/or sets of software routines, logic functions, and/or data structures that, when executed by a processor, perform specified operations. Although these modules are shown as distinct logical blocks, in other embodiments at least some of the operations performed by these modules may be combined into fewer blocks. For example, in some cases, databases may be combined. Conversely, any given one of modules 201-204 and/or 401-404 may be implemented such that their operations are split among two or more logical blocks. Although shown with a particular configuration, in other embodiments these various modules or blocks may be rearranged in other suitable ways.

Figure 5:
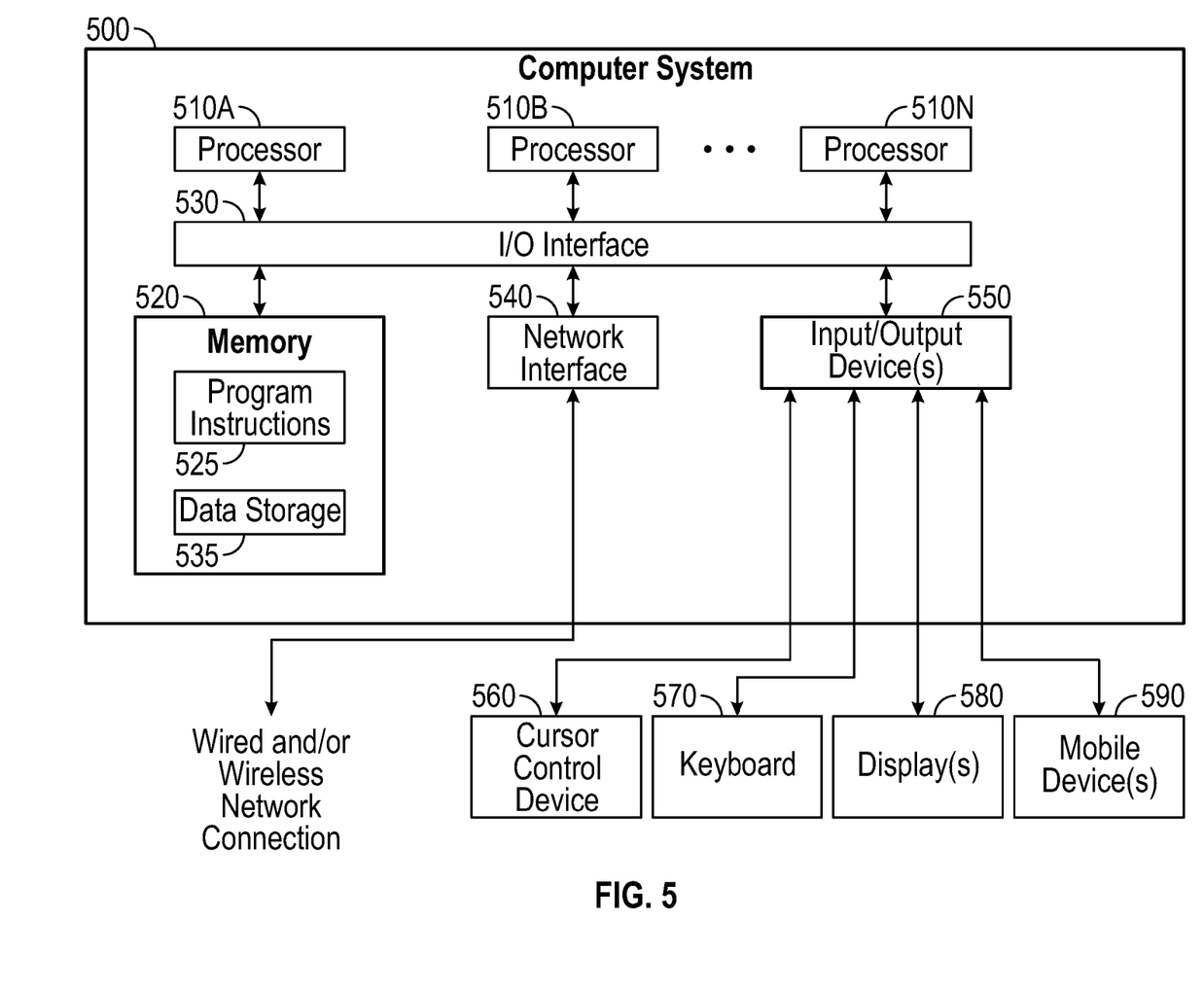
FIG. 5 is a diagram of an example of a computer system configured to implement various systems and methods described herein according to some embodiments.

As noted above, embodiments of systems and methods described herein may be implemented using one or more computer systems, and one such system is illustrated in FIG. 5. System 500 may be a server, a workstation, a desktop computer, a laptop, a tablet computer, a mobile device, a smart phone, or the like.

In some cases, system 500 may be used to implement communication system 101, IVR 117, LBS system 118, and/or one or more communication devices. For example, devices 102-105, 112, and 113 may be implemented as dedicated processor-based, electronic devices similar to computer system 500. Additionally, or alternatively, these devices may be implemented as integrated components of computer system 500 (e.g., as part of a tablet computing device or the like).

Computer system 500 includes one or more processors 510A-N coupled to a system memory 520 via an input/output (I/O) interface 530. Computer system 500 further includes a network interface 540 coupled to I/O interface 530, and one or more input/output devices 450, such as cursor control device 460, keyboard 470, display(s) 480, or mobile device(s) 490. Other devices may include, for example, surveillance cameras, microphones, antennas/wireless transducers, phone detection modules, etc. In some embodiments, each of communication system 101, LBS system 118, location engine 401, visitation system 130 and/or one or more of devices 103-106 and 109-113 may be implemented using a single instance of computer system 500, while in other embodiments multiple such systems, or multiple nodes making up computer system 500, may be configured to host different portions of a given electronic device or system.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 6-12, may be stored within system memory 520 as program instructions 525 and data storage 535, respectively.

In other embodiments, program instructions and/or data may be received, sent or stored upon different types of computer-accessible media or on similar media separate from system memory 520 or computer system 500. Generally speaking, a computer-accessible medium may include any tangible storage media or memory media such as electronic, magnetic, or optical media—e.g., disk or CD/DVD-ROM coupled to computer system 500 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 530 may be configured to coordinate I/O traffic between processor 510, system memory 520, and any peripheral devices in the device, including network interface 540 or other peripheral interfaces, such as input/output devices 450. In some embodiments, I/O interface 530 may perform any necessary protocol, timing or other data transformations to convert data signals from one component (e.g., system memory 520) into a format suitable for use by another component (e.g., processor 510).

In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, mobile devices, or any other devices suitable for entering or retrieving data by one or more computer system 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Memory 520 may include program instructions 525, configured to implement certain embodiments described herein, and data storage 535, comprising various data may be accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

In some embodiments, the various systems described above may operate such that, when an inmate places a remote communication through communication processing system 101, a lookup may be performed (e.g., by LBS system 118 and/or location engine 401) into a web service that identifies that the remote communication is to a cell phone or other mobile device, acquire and store the related information, and make a decision if the remote communication is allowed to be connected or not. For example, a first web service call may be used for determining if the remote communication is to a cell phone or mobile device and providing the related information, and a second web service call may be used to gather and process any geo-fencing rules. Moreover, these service calls may be performed in real-time or near real-time.

In some cases, LBS system 118 and/or location engine 401 may be able to process special numbers if configured as geo-fence exempt. Also, LBS system 118 may play appropriate audio messages to the called party and track their acceptance to the terms and conditions (e.g., through IVR system 117) for receiving a video visitation request or call from (or placing a video visitation request or call to) an inmate at a facility that has geo-fencing enabled.

Figure 6:
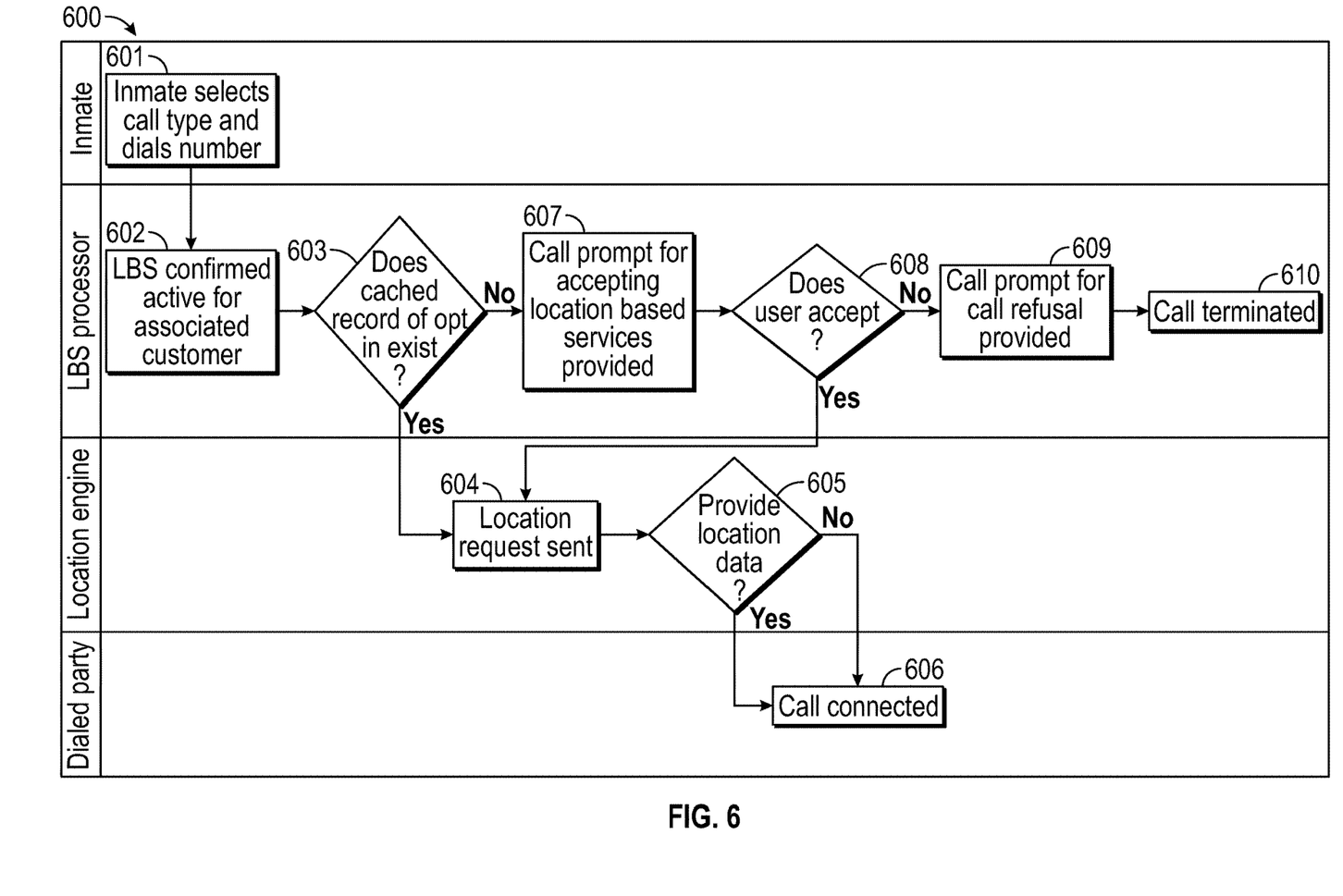
FIG. 6 is a diagram of an example of a method for providing Location-Based Services (LBS) remote visitation session or call processing according to some embodiments.

FIG. 6 is a flowchart of method 600 of LBS video visitation session or call processing. In some embodiments, method 600 may be performed, at least in part, by LBS system 118 of FIG. 1. At block 601, method 600 may allow an inmate of facility 100 to select a remote communication type (e.g., PSTN, VoIP, etc.) and dial a phone number or otherwise select a mobile device of a non-resident (e.g., using the non-resident's name, username, email address, device ID, MAC address, etc.). This operation may be implemented, for example, via IVR system 117 or the like.

At block 602, LBS processor 113 may confirm that LBS services are active for the associated facility 100 or the associated non-resident. For example, LBS system 118 may inspect database 202 and determine that the called device is in fact a mobile device. Additionally, or alternatively, LBS system 118 may query location engine 401 to make this determination. At block 603, method 600 may (optionally) identify whether there exists a record of a previous authorization or consent by the non-resident to have the physical or geographic location of his or her mobile device tracked by facility 100 (e.g., by consulting database 202).

At block 604, if a previous and non-expired authorization is found, LBS system 118 and/or location engine 401 may (optionally) transmit a request for the mobile device's spatial or location information (e.g., to carrier 107, ISP 111, and/or via GPS module 303). At block 605, method 600 determines whether the queried entity (e.g., carrier 107, ISP 111, etc.) was able to provide the device's spatial or location information.

In some embodiments, regardless of the outcome of 605, the remote communication is established at block 606. However, if the device's spatial or location information is available, LBS system 118 may also be configured to add that information to a CDR created for that communication. Also, in other embodiments, the communication may be denied if the device's spatial or location information is not available (e.g., in situations involving high-risk inmates and/or non-residents). In some cases, block 606 may also charge an account of the inmate and/or non-resident for a telecommunication provider's fees associated with providing the spatial information. Additionally, or alternatively, these extra charges may be imposed at another suitable time during the execution of method 600.

At block 607, if a previous and current authorization is not found, LBS system 118 and/or location engine 401 may provide the non-resident with a prompt for accepting LBS services (e.g., via IVR system 117). If the non-resident agrees at block 608, control passes to block 604. Otherwise, a call prompt refusing to establish the remote communication may be provided at block 609, and the communication may be terminated at block 610.

In some embodiments, LBS system 118 may allow users to specify a phone number as "covert monitor" without providing consent to the called party and/or without the called party even operating the device or receiving a call. This feature may be useful, for example, if facility 100 is required by a court order or warrant to track a called party's cell phone number regardless of that party receiving or placing a video visitation session or telephone call to or from an inmate. Moreover, LBS system 118 may include "send to phone" capabilities that forward the location coordinates of a violating communication to an investigator's cell phone (e.g., via text message or email) with mapping information.

Figure 7:
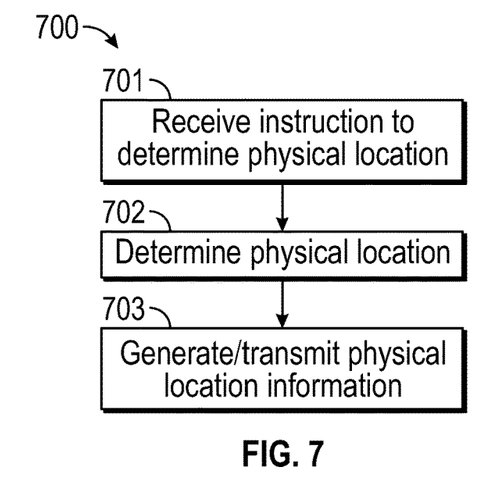
FIG. 7 is a diagram of an example of a method of determining a mobile device's physical location according to some embodiments.

FIG. 7 is a flowchart of a method of determining a mobile device's physical location. In some embodiments, method 700 may be performed, at least in part, by location engine 401 of FIG. 4.

At block 701, method 700 may receive an instruction (e.g., as a web service call from LBS system 118) to determine a physical location of a particular mobile device. At block 702, location engine 401 may issue a query to at least one or more carriers, ISPs, and/or GPS 303 to retrieve the requested information. For example, in some cases, the instruction may include an electronic authorization given by the non-resident operator of the mobile device, which may in turn allow a wireless carrier or ISP to provide the device's spatial or location information to location engine 401. A carrier may track the physical location of mobile device using GPS, an E911 system, cell tower triangulation, or other system.

At block 703, location engine 401 may generate and/or transmit physical or geographic location information to LBS system 118. In some embodiments, location engine 401 may further determine, calculate, or estimate a margin of uncertainty associated with the spatial or location information depending upon the source of the information (e.g., by type of carrier, etc.) and transmit that additional information to LBS system 118.

Figure 8:
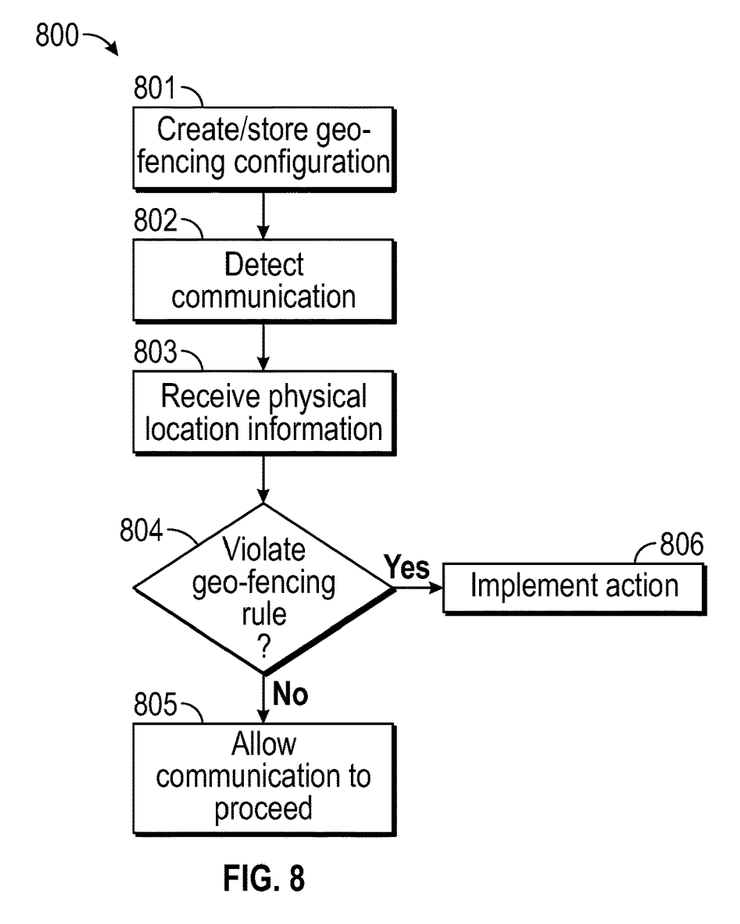
FIG. 8 is a diagram of an example of a geo-fencing enforcement method according to some embodiments.

FIG. 8 is a flowchart of geo-fencing enforcement method 800. In some embodiments, method 800 may be implemented, at least in part, by LBS processor 200 of FIG. 2. As shown, at block 801, method 800 may create or store geo-fencing configurations implemented by a controlled-environment facility. For instance, LBS processor 200 may allow a user (e.g., prison staff, investigator, etc.) to access and/or manage geo-fencing database 203 via GUI module 201. Examples of screenshots that may be generated by GUI module 201 are discussed in FIGS. 9-11 below. At block 802, method 800 may detect a request for a remote communication. Such a request may have been initiated by an inmate and/or non-resident of facility 100. At block 803, LBS processor 200 may receive physical or geographic location information, for example, in response to an instruction sent to location engine 401.

At block 804, method 800 may determine whether the spatial or location information violates or is in compliance with applicable geo-fencing rule(s). Examples of geo-fencing rules include, but are not limited to, one or more areas to which an inmate is not allowed to call (or receive video visitation sessions or calls), or one or more areas to which an inmate is allowed to call (or receive video visitation sessions or calls) to the exclusion of other area(s). These rules may be inmate, non-resident, type of communication (e.g., cellular vs. IP), and/or device specific. Moreover, in some cases, LBS processor 200 may specify a phone number as a "multi-track" (or "continuous-track") number, which may gather spatial or location information periodically and/or several times throughout a remote communication instead of just at the beginning or end of the communication (which could allow the non-resident to enter and leave an otherwise geo-fenced area undetected).

Furthermore, physical or geographic areas may be defined in a linear fashion (e.g., west/east of a given longitude or north/south of a given latitude), a circular fashion (e.g., latitude and longitude of a center point plus a radius), by Zone Improvement Plan (ZIP), by area code, by city, county, state, etc. For example, LBS processor 200 may allow for authorized called party phone numbers to be configured to not disconnect if within geo-fence proximity, so as to allow video visitation sessions or calls to that number no matter how close they are to facility 100. If in compliance, LBS processor 200 may allow the remote communication to be established and/or to continue at block 805. Otherwise, LBS processor 200 may take corrective action at block 806.

Examples of corrective action include, but are not limited to, terminating the remote communication, recording the communication, providing a live-monitoring feed of the communication to an investigator or prison staff, etc.

In various embodiments, GUI module 201 of LBS system 118 may provide a user interface to authorized users (e.g., investigative staff or the like). Such an interface may allow a user to view, create, and edit geo-fencing rules, call detail records, mapped spatial or location information, margins of uncertainty, etc. For example, GUI module 301 may be configured to report on related video visitation sessions or calls within a selectable proximity to one or more areas, to display one or more CRDs on a geographic map, to display a correlation between a device's BNA and physical location, etc. GUI module 301 may also allow authorized users to take predetermined actions and to receive real time information through the web service outside of any current video visitation session or call in progress. For example, assume an inmate calls a non-resident party at a given time.

The called party's latitude and longitude puts the called party at a murder scene at the same time as the inmate phone call. Sometime later, the investigator may wish to know where the called party, who is a suspect in the murder case, is located. As such, the investigator may take an action via GUI module 301 to receive the desired location information of the called party, which may or may not require a warrant or court order. In some embodiments, ad hoc queries of LBS processor 300 may have their own security privileges so they require a higher level of authorization and may be tracked for transactional reporting purposes, transactional billing purposes, and overall usage reporting purposes.

Figure 9:
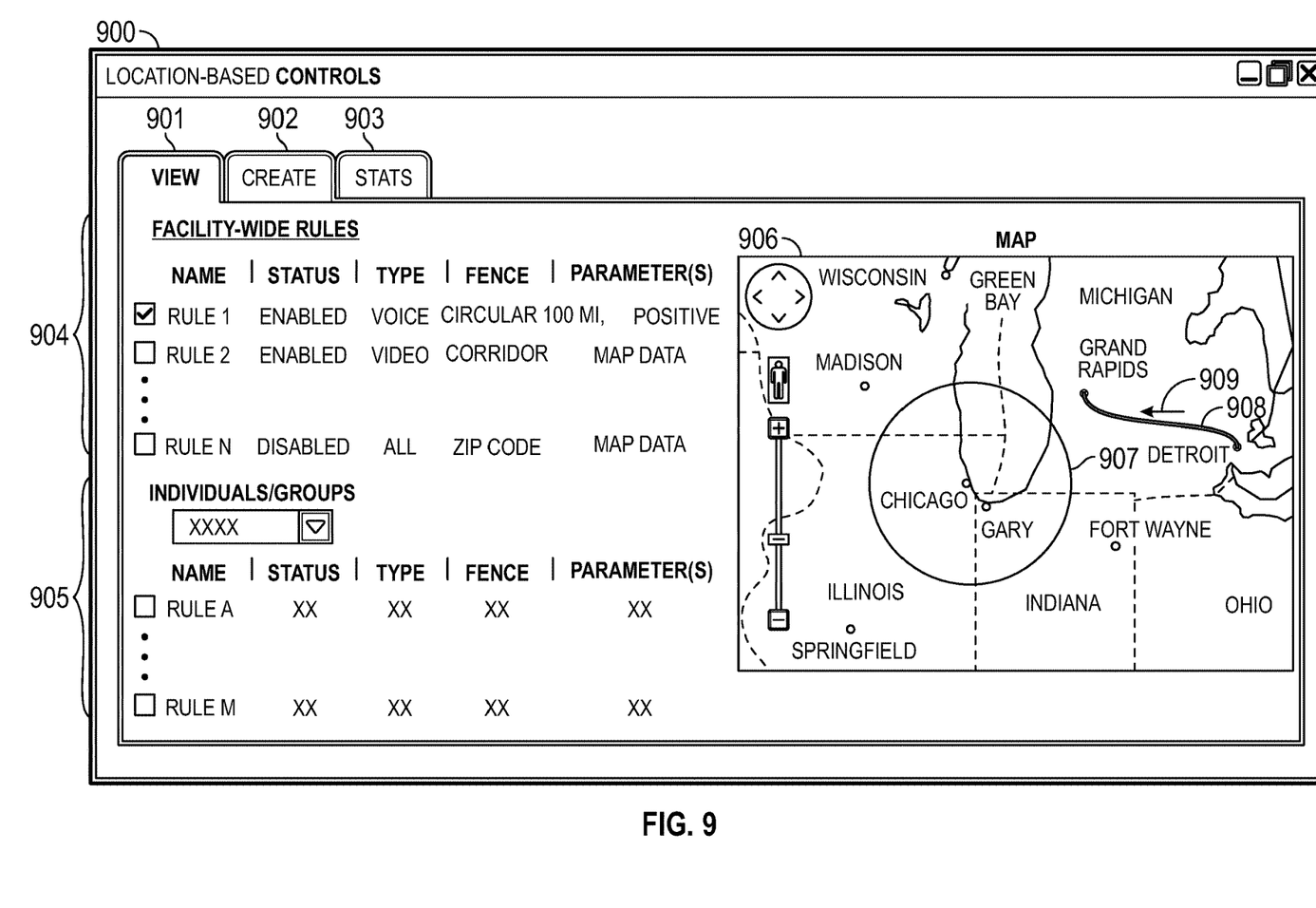
FIGS. 9-12 are diagrams of examples of an LBS system's application interface according to some embodiments.
Figure 10:
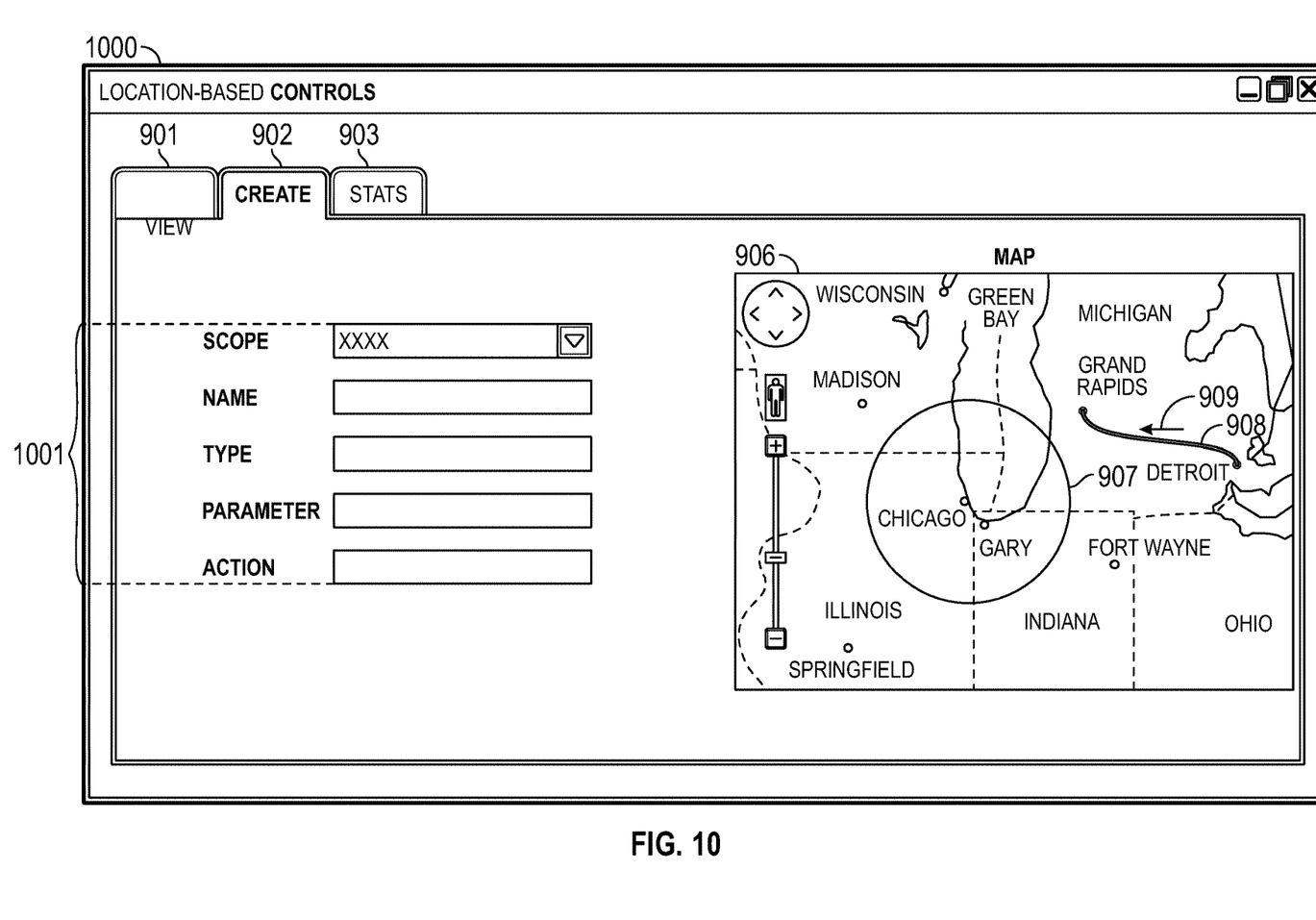
Figure 11:
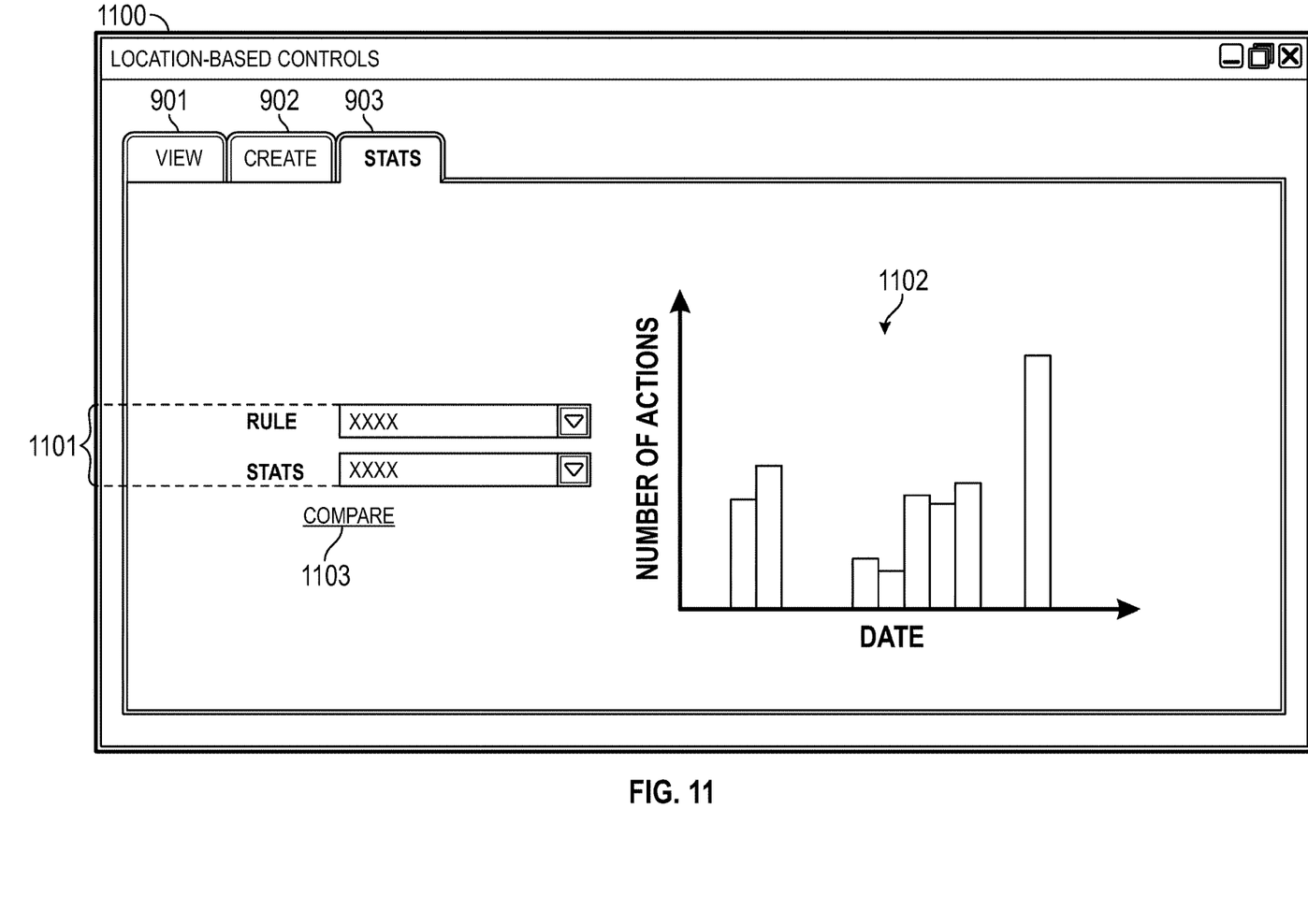

FIGS. 9-11 are rendered screenshots 900-1100 of an LBS software application that may be produced by GUI module 301 according to some embodiments. In various implementations, the software application may be cloud or web-based, although in other implementations the application may be a stand-alone, executable program.

As illustrated, three "tabs" 901-903 provide an authorized user with geo-fencing rules' viewing, creation, and statistics options. In FIG. 9, "view" tab 901 is selected, thus allowing a user to view outstanding geo-fencing rules 904. These geo-fencing rules may be facility-wide rules 904 and/or individual rules 905 that are applicable to individual inmates or sub-groups of inmates (e.g., known gangs, etc.).

For example, for each rule 904 stored in database 203, one or more of the following may be provided: the name of the rule, the status of the rule (e.g., enabled or disabled), the type of geo-fencing rule (e.g., circular, ZIP, highway, corridor etc.), one or more parameters associated with the rule (e.g., radius, latitude and longitude, etc.), whether the rule is positively or negatively defined (i.e., whether a mobile device may receive a call only if within a selected area, or only if outside of that area), etc. Other information may include a number of violations associated with each rule, CDRs for each violation, etc.

Still referring to FIG. 9, a map portion 906 of screenshot 900 may provide a geographic indication of the rule selected in portions 904 and/or 905. Upon selection of a rule, map 906 may render spatial or location information for communication(s) associated with each rule. For example, map 906 may also render boundary 907, corridor 908 (in this case, a highway between two cities), and direction of travel 909 of a non-resident device.

In FIG. 10, screenshot 1000 shows "create" tab 902 selected by a user, thus allowing the user to enter or edit one or more fields for one or more geo-fencing rules. For example, the user may select a scope of the rule (e.g., facility-wide, for a group of inmates, for an individual inmate, etc.), as well as a name of the rule, a type of rule (e.g., circular, etc.), one or more rule parameters, and one or more actions (e.g., alerts, etc.) to be taken in response to a violation of that rule.

Examples of information that may be added to any given rule include, but are not limited to: a description of the rule; a status of the rule (e.g., active, inactive, etc.); an address, city, state, ZIP code, latitude, longitude, radius, diameter, length, or measurement or a region associated with the rule; a start time, start date, end time, and end date for the rule; an identification of a person or persons who created the rule and its date of creation; the name of an author or authors of one or more previous rule modification and the date of such modifications; an indication of whether the rule is private or shared; etc.

As shown, map portion 906 may automatically represent geo-fences 907, 908, and/or 909, covered by the rules overlaid upon a geographic map. Furthermore, the size, type, length, and location of geo-fences 907, 908, and/or 909 may be updated continuously and/or in response to a modification of fields 1001. In some cases, map portion 906 may be interactive and the investigator may manipulate or pinpoint the locations on the map in order to generate or create the geo-fencing rule, thus automatically updating the rule displayed in portion 1001.

In FIG. 11, screenshot 1100 shows "statistics" tab 903 selected by a user, thus enabling the user to obtain information regarding the execution of one or more geo-fencing rules. For example, the user may select one or more rules and desired statistics at 1101, and a corresponding graph 1102 may be rendered.

Examples of statistics include, but are not limited to: a number of call terminations, a number of alerts issued, a number of live-monitoring events, and/or a number of recording events. These statistics may be presented by date, time, inmate, non-resident, phone number or device ID, etc. In some embodiments, a "compare" button or hyperlink 1103 may allow the user to combine statistics of two or more rules on a single graph (e.g., in different colors), for example. Also, the user may select one or more elements on graph 906 to display or show CDRs with spatial or location information for one or more video visitation sessions or calls affected by the selected rule(s).

It should be noted that, although the examples shown in FIGS. 9-11 describe a user interface based on "tabs," other implementation may utilize any other suitable navigational or operational tools. For example, in other embodiments, GUI module 301 may provide user interface(s) based upon one or more menus (e.g., hierarchical menus), hyperlinks, web pages, worksheets, buttons, etc. More generally, it should be understood that the screenshots of FIGS. 9-11 are presented only by way of illustration, and not limitation.

Figure 12:
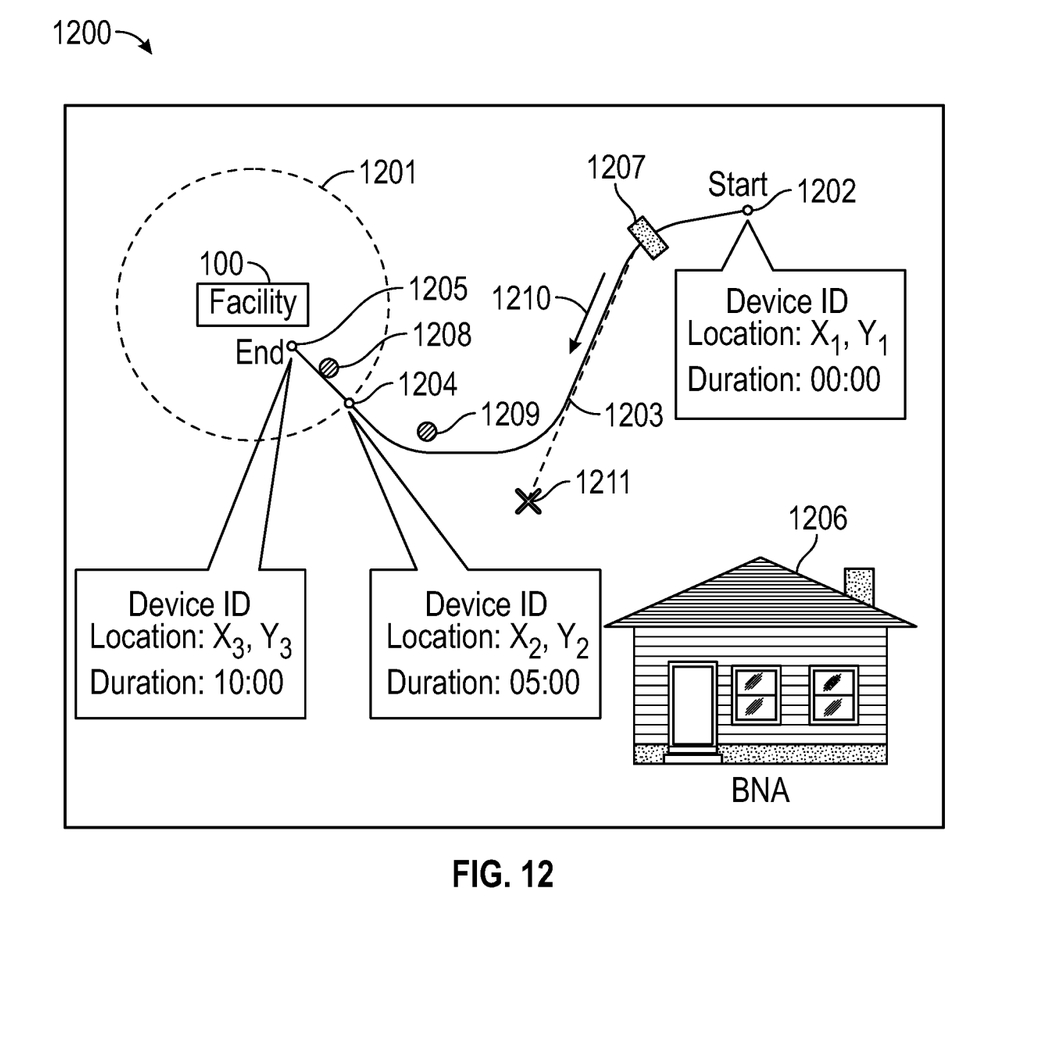

FIG. 12 shows screenshot 1200 illustrating an example of a map according to some embodiments. Specifically, facility 100 may be shown along region 1201 depicting a predetermined geo-fencing rule (i.e., some corrective action is invoked if the called party is within region 1201).

In this example, a non-resident party receives or initiates a video visitation session or a call with a mobile device at a starting position 1202. Along with point 1202, this mapping feature may also display a dialog box that indicates the device ID or called party ID, the calling party ID, the actual physical or geographic location of the mobile device, and the duration of the video visitation session or call at that point (i.e., 00:00 in this case). The dialog box may also indicate the physical distance between point 1202 and facility 100 and/or region 1201, as well as the physical distance between point 1202 and a BNA information associated with the mobile device 1206.

As the video visitation progresses, the map feature(s) of FIG. 12 may render trajectory 1203 of the mobile device as the non-resident party physically moves. In this example, at point 1204 (at time stamp 05:00), the mobile device violates the geo-fencing rule of region 1204 and some corrective action may be selected (e.g., the video visitation session or call may trigger an alert to be recorded, monitored, terminated, etc.). At point 1205 (at time stamp 10:00), the called or calling party may terminate the video visitation session or call (e.g., voluntarily).

In some embodiments, sliding cursor 1207 may allow an investigator to retrace trajectory 1203 and determine at what location the non-resident party was during what point of the call. In cases the video visitation session or call is recorded, for instance, the cursor may be synchronized with the audio recording to facilitate review. As an example, if the non-resident picks another party up at some point on the way to facility 100, synchronized review allows an investigator to identify when and where such an event took place. In some cases, when the investigator replays the video recording, sliding cursor 1207 may move along trajectory 1203. Additionally, or alternatively, sliding cursor 1207 may be used to pause, rewind or forward the audio recording.

Dialog boxes with aforementioned video visitation session or call information may be displayed at predetermined points of trajectory 1203 and/or may be displayed with cursor 1207. In various embodiments, the map feature(s) of FIG. 12 may be displayed in real-time, as the video visitation session or call progresses. Additionally, or alternatively, the map feature(s) may be stored as part of a CDR or the like. As such, these feature(s) may allow the display of true video visitation session or call termination on a map, in addition to the facility address location and the BNA location.

This may provide a full picture of where the video visitation session initiation or call came from, where it terminated, and/or the address it is registered to. It may also help law enforcement by providing not only the called parties home address, but where they were at the time of the call. Additionally, it may tell law enforcement where a non-resident as in proximity to the correctional facility as well as where he or she was in proximity to their home address (e.g., if law enforcement needs to set up a sting operation or the like).

In some embodiments, a rule may include a direction of travel, for example, when the geo-fence is along a highway or corridor. Direction of travel 1210 of the non-resident's communication device during the video visitation session or call may be received from a wireless carrier and/or calculated by LBS processor 300. In some cases, the highway or corridor may be used in a criminal activity associated with the resident, as indicated in AMS 116 or an input by an investigator, for example.

Accordingly, a violation of a rule involving the corridor may include a particular direction of travel restriction. Should direction of travel 1210 match a forbidden direction (e.g., toward the controlled-environment facility, out of a particular jurisdiction, etc.) during the video visitation session or call—in this case, toward point of interest 1211—it may result in the monitoring of the video visitation session or call, recording of the video visitation session, termination of the video visitation session or call, and/or an alert or notification.

In some implementations, rules may include three-way video visitation restrictions in a geo-fenced area. For example, one or more non-residents may be alongside path 1203; non-resident 1208 is within geo-fence 1201, and non-resident 1209 is outside. The location of non-residents 1208 and 1209 may be obtained and kept, for example, in response to AMS identifying non-residents 1208 and 1209 as potential accomplices or persons of interest at the outset of the video visitation session or call. Additionally, or alternatively, communication processing system 101 and/or visitation 130 may detect the presence of an unauthorized third-party participating in the video visitation session or call, regardless of whether the third-party's identity is known.

In some cases, the presence of non-resident 1208 inside of geo-fence 1201 triggers a corrective action, whereas the presence of non-resident 1209 outside of geo-fence 1201 does not. In other cases, the presence of non-resident 1209 outside of geo-fence 1201 triggers a corrective action, whereas the presence of non-resident 1208 inside of geo-fence 1201 does not. In yet other cases, the presence of non-resident 1209 outside of geo-fence 1201 triggers a first corrective action (e.g., alert and/or recording), and the presence of non-resident 1208 inside of geo-fence 1201 triggers a second corrective action (monitoring or terminating the video visitation or call). In still other cases, a communication with a first non-resident that produces a video session where another non-resident participates may also trigger corrective action. Similar rules may be applied to geo-fences 908 and 909.

Accordingly, a violation of a rule involving the corridor may include a particular direction of travel restriction. Should direction of travel 1210 match a forbidden direction (e.g., toward the controlled-environment facility, out of a particular jurisdiction, etc.) during the video visitation session or call—in this case, toward point of interest 1211—it may result in the monitoring of the video visitation session or call, recording of the video visitation session, termination of the video visitation session or call, and/or an alert or notification.

The various systems and methods illustrated in the figures and described herein represent example embodiments of systems and methods for location-based services for controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
    creating at least one geo-fencing rule to apply to visitation sessions between residents and non-residents of a controlled-environment facility, wherein the geo-fencing rule comprises a status of the rule, a type classification of rule, one or more parameters associated with the rule and whether the rule is positively or negatively defined;
    identifying a request to establish a visitation session between a resident and a non-resident of the controlled-environment facility, wherein the visitation session includes at least one of: a voice or a video call, and wherein the non-resident operates a mobile device;

receiving spatial information of the mobile device, wherein the spatial information comprises a location of the mobile device; and applying a geo-fencing rule to the visitation session based upon the spatial information, wherein applying the rule includes determining that the location of the mobile device is within a selected geographic area.

2. The method of claim 1, wherein the controlled-environment facility is a correctional facility, and wherein the resident is an inmate.

3. The method of claim 1, wherein the spatial information further comprises a direction of travel of the mobile device, and wherein applying the rule includes determining that the direction of travel is within a selected trajectory.

4. The method of claim 1, wherein the spatial information further comprises a proximity to another mobile device associated with another non-resident.

5. The method of claim 1, further comprising receiving the spatial information periodically during the visitation session.

6. The method of claim 5, further comprising charging an account of the resident for a telecommunication provider's fees associated with providing the spatial information.

7. The method of claim 1, wherein applying the rule comprises at least one of: flagging the visitation session for monitoring or recording, or issuing an alert provided in the rule.

8. The method of claim 1, wherein the visitation session is a Video Relay Service (VRS) call.

9. A system, comprising:
a processor; and
a memory coupled to the processor, the memory having computer-readable instructions stored thereon that, upon execution by the processor, cause the system to:
store at least one geo-fencing rule to apply to visitation sessions between residents and non-residents of a controlled-environment facility, wherein the geo-fencing rule comprises a status of the rule, a type classification of rule, one or more parameters associated with the rule and whether the rule is positively or negatively defined;
identify a request to establish a video visitation session between a resident and a non-resident of the controlled-environment facility, wherein the non-resident operates a mobile device;
receive spatial information of the mobile device, wherein the spatial information comprises a location of the mobile device;
apply the geo-fencing rule to the video visitation session based upon the spatial information, wherein applying the geo-fencing rule includes determining that the location of the mobile device is within a selected geographic area;

receive updated spatial information periodically during the visitation session; and
apply a rule to the video visitation session based upon the updated spatial information.

10. The system of claim 9, wherein the spatial information comprises a direction of travel of the mobile device, and wherein applying the rule includes determining that the direction of travel is within a selected trajectory.

11. The system of claim 9, wherein the spatial information comprises a proximity to another mobile device associated with another non-resident.

12. The system of claim 9, wherein applying the rule comprises at least one of: flagging the video visitation session for monitoring or recording, or issuing an alert associated with the rule.

13. A hardware memory device having computer-readable instructions stored thereon that, upon execution by a processor, cause a computer system to:
create at least one geo-fencing rule to apply to visitation sessions between residents and non-residents of a controlled-environment facility, wherein the geo-fencing rule comprises a status of the rule, a type classification of rule, one or more parameters associated with the rule and whether the rule is positively or negatively defined;
identify a request to establish a video visitation session between a resident and a non-resident of the controlled-environment facility, wherein the non-resident operates a mobile device;
receive spatial information of the mobile device, wherein the spatial information comprises a location of the mobile device; and
apply a geo-fencing rule to the video visitation session based upon the spatial information, wherein applying the rule includes determining that the location of the mobile device is within a selected geographic area and permitting the visitation session when the location of the mobile device is outside of the selected geographic area.

14. The hardware memory device of claim 13, wherein the spatial information further comprises a direction of travel of the mobile device, and wherein applying the rule includes determining that the direction of travel is within a selected trajectory.

15. The hardware memory device of claim 13, wherein the spatial information further comprises a proximity to another mobile device associated with another non-resident.

16. The hardware memory device of claim 13, wherein applying the rule comprises at least one of: flagging the video visitation session for monitoring or recording, or issuing an alert associated with the rule.

* * * * *